US009538557B2

United States Patent
Fedotenko (10) Patent No.: US 9,538,557 B2
(45) Date of Patent: *Jan. 3, 2017

(54) SYSTEM AND METHOD FOR MANAGING CONNECTIONS FOR NETWORKS USED BY A COMMUNICATION DEVICE

(71) Applicant: BlackBerry Limited, Waterloo (CA)

(72) Inventor: Denis Fedotenko, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 303 days.

This patent is subject to a terminal disclaimer.

(21) Appl. No.: 13/960,199

(22) Filed: Aug. 6, 2013

(65) Prior Publication Data

US 2013/0322419 A1    Dec. 5, 2013

Related U.S. Application Data

(63) Continuation of application No. 11/745,608, filed on May 8, 2007, now Pat. No. 8,533,345.

(51) Int. Cl.
*H04W 76/00* (2009.01)
*H04W 8/18* (2009.01)
*H04L 29/08* (2006.01)
*H04W 4/02* (2009.01)

(52) U.S. Cl.
CPC ............ *H04W 76/00* (2013.01); *H04L 67/14* (2013.01); *H04L 67/30* (2013.01); *H04W 8/183* (2013.01); *H04W 4/02* (2013.01)

(58) Field of Classification Search
CPC ........ H04W 76/00; H04W 8/183; H04W 4/02; H04L 67/30; H04L 67/14
See application file for complete search history.

(56) References Cited

U.S. PATENT DOCUMENTS

| 8,200,773 | B2   | 6/2012  | Bluestone et al. |
|-----------|------|---------|------------------|
| 8,230,047 | B2   | 7/2012  | Pibhai et al.    |
| 8,533,345 | B2 * | 9/2013  | Fedotenko .................... 709/228 |
| 2003/0003933 | A1 * | 1/2003 | Deshpande et al. .......... 455/510 |
| 2005/0037755 | A1  | 2/2005  | Hind et al.     |
| 2005/0237967 | A1 * | 10/2005 | Lee et al. ...................... 370/328 |
| 2005/0239443 | A1  | 10/2005 | Watanabe et al. |
| 2005/0260989 | A1 * | 11/2005 | Pourtier et al. ............ 455/435.3 |
| 2006/0026160 | A1  | 2/2006  | Duroj            |

(Continued)

FOREIGN PATENT DOCUMENTS

WO    WO 01/45446 A1    6/2001

*Primary Examiner* — Andrew Lai
*Assistant Examiner* — Chuong M Nguyen
(74) *Attorney, Agent, or Firm* — Perry + Currier Inc.

(57) ABSTRACT

The disclosure relates to a system and method for managing a profile list for connections to networks for a communication device. The method comprises: maintaining a list of profiles of network connections for the communication device for presentation on a display of the communication device, the list of profiles representing connections to the networks; upon detection of a connection for the communication device to a network, determining whether the connection is in the list of profiles and if the connection is not in the list, establishing a temporary profile with a time condition for the connection and adding the temporary profile to the list of profiles; and removing the temporary profile from the list of profiles when at least the time condition is not satisfied.

20 Claims, 5 Drawing Sheets (56) References Cited

U.S. PATENT DOCUMENTS

2006/0073788 A1     4/2006   Haikka et al.
2007/0041542 A1*   2/2007   Schramm et al. ....... 379/142.07
2007/0067446 A1*   3/2007   Jones et al. ................... 709/224
2007/0268877 A1*   11/2007   Buckley et al. .............. 370/338

* cited by examiner

SYSTEM AND METHOD FOR MANAGING CONNECTIONS FOR NETWORKS USED BY A COMMUNICATION DEVICE

RELATED APPLICATION

This application is a continuation application of U.S. patent application Ser. No. 11/745,608 filed on May 8, 2007.

FIELD OF DISCLOSURE

The disclosure described herein relates to a system and method for managing connections (and profiles) for communication networks used by a communication device. In particular, the system and method may be used for identifying and using temporary, temporal access profiles relating to networks, such as in IEEE 802.11x-compliant networks.

BACKGROUND

Wireless handheld mobile communication devices perform a variety of functions to enable mobile users to stay organized and in contact with others in a communication network through e-mail, schedulers and address books.

As wireless devices are portable, they connect and communicate with several different wireless communication networks as they roam about the land. As a wireless device roams, it seeks and negotiates a connection with a target network as it detects that it is entering the communication range of the network. For each network, a device typically stores a profile that relates to the network, such that the profile provides connectivity information about the network to the device. As a device can have access to several networks, the device may have a multitude of profiles. In some instances, some of the profiles do not need to be accessed, as they are not relevant, having regard to the current location of the device. This can lead to unnecessary presentation of profiles on the device and unneeded access attempts by the system.

There is a need for a system and method which addresses deficiencies in the prior art.

BRIEF DESCRIPTION OF THE DRAWINGS

Embodiments of the disclosure will now be described, by way of example only, with reference to the accompanying drawings, in which.

DETAILED DESCRIPTION OF AN EMBODIMENT

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect, a method for managing connections to networks for a communication device is provided. The method comprises: maintaining a list of profiles of network connections for the communication device for presentation on a display of the communication device, the list of profiles representing connections to the networks; upon detection of a connection for the communication device to a network, determining whether the connection is in the list of profiles and if the connection is not in the list, establishing a temporary profile with a time condition for the connection and adding the temporary profile to the list of profiles; and removing the temporary profile from the list of profiles when at least the time condition is not satisfied.

In the method, the time condition may be that the communication device has used the connection within a set time.

The method may further comprise resetting a profile time associated with the temporary profile to zero when the communication device uses the connection, thereby resetting the time condition.

In the method, removing the temporary profile from the list of profiles may comprise deleting the temporary profile from the list of profiles. Alternatively, removing the temporary profile from the list of profiles may comprise: removing the temporary profile from the list of profiles; and adding the temporary profile to a list of deactivated profiles.

In the method, the temporary profile may be removed from the list of profiles when both the time condition is not satisfied and a location parameter for the communication device is not satisfied.

In the method, the temporary profile may be displayed at the top of the list of profiles with any other temporary profiles.

In the method, the list of profiles may list an active profile below the temporary profiles.

In the method, the temporary profile may be convertible to an active profile upon an activation condition.

The method may further comprise: scanning for additional available networks when the connection is accessed by the communication device; and displaying in the list of profiles a located network from the scanning.

In the method, when scanning for network connections, connections in a first section of the list of profiles may be scanned before connections in a second section of the list of profiles.

The method may further comprise maintaining cached profiles in the list of profiles, where a cached profile represents a connection to a neighbouring network detected while the communication device is connected to another network.

In the method, the time condition may permit short periods of non-contact of the communication device with the connection within the set time.

In the method the list of profiles may have a maximum number of profiles.

In the method, the networks may be 802.11-class networks.

In a second aspect, a communication device is provided, comprising: a display; a communications module for transmitting and receiving communication signals with a plurality of networks; a network communication management module for monitoring connections detected by the communication device; data storage containing a list of profiles of network connections for the communication device; and a module to upon detection of a connection for the communication device to a network, determine whether the connection is in the list of profiles and if the connection is not in the list establish a temporary profile with a time condition for the connection, add the temporary profile to the list of profiles and remove the temporary profile from the list of profiles when at least the time condition is not satisfied.

In the communication device, the time condition may be that the communication device had used the connection within a set time.

In the communication device, the module may further reset a profile time associated with the temporary profile to zero when the communication device uses the connection to reset the time condition.

In the communication device, the module may remove the temporary profile from the list of profiles by deleting the temporary profile from the list of profiles. Alternatively, the module may remove the temporary profile from the list of profiles by: removing the temporary profile from the list of profiles; and adding the temporary profile to a list of deactivated profiles.

In another aspect, a method for managing connections to networks for a communication device on the device is provided. The method comprises: maintaining a list of profiles of network connections for the device for presentation on a display of the device; upon detection of a connection for the device to a network, determining whether the connection is in the list; if the connection is not in the list then establishing a temporary profile for the connection, establishing a set of activation conditions for the temporary profile, and adding the temporary profile to the list; scanning the list for any temporary profiles; for each temporary profile in the list determining whether its activation conditions are satisfied and if the activation conditions are not satisfied, then removing that temporary profile from the profile list; and selectively displaying the list on the display in a GUI.

The method may further comprise scanning for connections using only connections associated with profiles in the list.

In the method, the set of profile activation conditions for the temporary profile may include a condition that the device has had communications contact with the network associated with the temporary profile within a set time, such as about one day's time.

In the method, the condition may allow for short periods of non-contact within the set time, such as less than 30 minutes (preferably less than 10 minutes).

In the method, the temporary profiles in the list may be displayed at the top of the list in the GUI.

In the method, the set of profile activation conditions for the temporary profile may further include a location parameter for the device, such as a requirement that the device be or not be in a specific location, area code, etc.

In the method, the list may track an active profile that is included in the list in the GUI, where the active profile is a profile which is used in the process of scanning for the neighbouring networks.

In the method, the active profile may be displayed in below the temporary profiles in the list in the GUI.

In the method, the networks may be of the same class, such as 802.11-class networks.

In the method, the temporary profile may be converted to an active profile, particularly upon certain conditions, such as establishment of a connection for a minimum amount of time.

The method may further comprise: scanning for additional available networks when the network associated with the temporary profile is accessed by the device; and displaying in the GUI any located network from the scanning.

The method may further comprise removing the associated available network(s) from the list when the temporary profile is removed from the list.

In yet another aspect, a portable communication device is provided. The device comprises: a display; a communications module for transmitting and receiving communication signals with a plurality of networks; a network communication management module for monitoring connections detected by the device; data storage containing a list of profiles of network connections for the device for presentation on the display of the device; a first module to monitor for detection of a connection for the device to a network and to determine whether the connection is in the list; a second module to present a set of activation conditions for a temporary profile for the connection if the connection is not in the list that can be selected by the user and to add the temporary profile to the list; and a third module to generate a GUI selectively displaying the list in a manner to provide prominence to the temporary profile on the display.

The device may include a fourth module to remove the temporary profile from the profile list when its activation conditions are not satisfied.

In the device, the network communication module may be selectively set to scan for connections using only connections associated with profiles in the list.

In the device, the set of profile activation conditions for the temporary profile may include a condition that the device has had communications contact with the network associated with the temporary profile within a set time.

In the device, the second module may display the temporary profiles in the list at the top of the list in the GUI.

In the device, the set of profile activation conditions for the temporary profile may further include a location parameter for the device.

In the device, the list may track a non-temporary, active profile that is included in the list in the GUI and that profile may be displayed below the temporary profiles in the list in the GUI.

In the device, the networks may be 802.11-class networks.

In other aspects, various combinations of sets and subsets of the above aspects are provided.

Exemplary details of embodiments are provided herein. Briefly an embodiment provides a method and system to present a set of network connection profiles for a device to a user of the device. In one embodiment different profiles are shown depending on the current environment of the device. When identifying a set of profiles to provide, instead of listing all profiles to all networks, an embodiment relies on other characteristics, parameters or information to determine when and what profile(s) to present to the user. As such, a set of temporary profiles can be maintained, shown and selectively deleted from the device. For example, a temporary profile can be flagged as being active for a preset period of time or only when the device is detected to be in, or not in, a specific location. When the activation conditions for a temporary profile are not met, the profile may be deactivated or deleted. In another embodiment, all profiles are shown (including all active, disabled and temporary profiles). First, a description is provided on general concepts and features of an embodiment and its related network, network-detection algorithms and profile maintenance algorithms.

Figure 1:
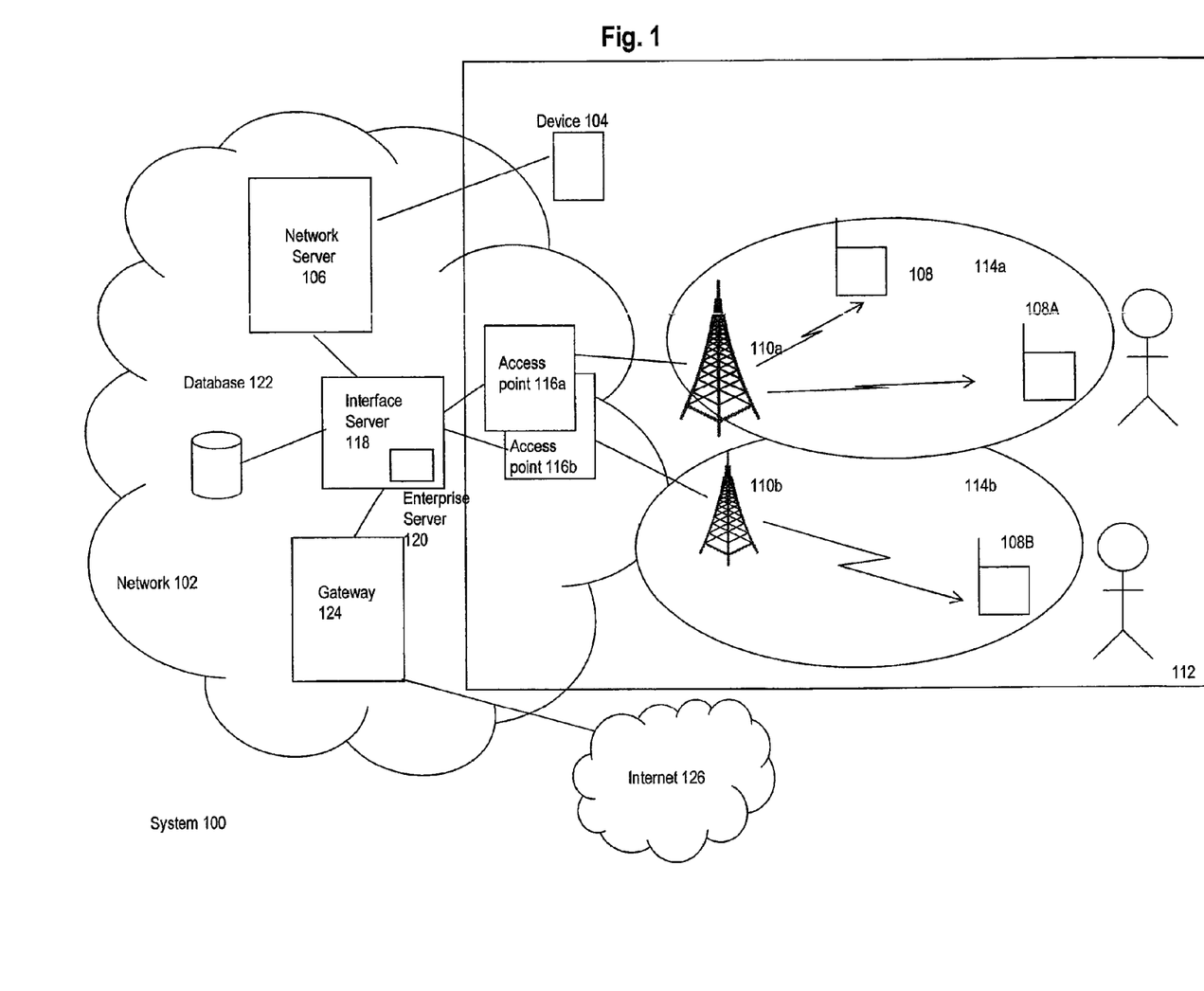
FIG. 1 is a schematic diagram of a communication network having a plurality of wireless networks therein that can communicate with a wireless device as provided in an embodiment.

To begin, details on an exemplary network and its communicating device for an embodiment are provided. FIG. 1 shows communication system 100 where network 102 provides a suite of applications, services and data to its connected devices 104 through its associated servers. Devices 104 connect to network 102 through wired connections to network server 106 which has software and hardware facilities to manage all communications of data and messages among devices communicating in network 102. Network 102 can be implemented in any known architecture, providing wired or wireless connections to its elements.

Wireless devices 108 communicate with other devices through wireless networks 110. In many environments, networks 110 are local, geographically small, wireless networks (such as wireless local area networks or WLANs), perhaps being contained within a single building 112. Wireless devices 108 include handheld devices, cell phones and computers (either desktop or portable) having a (wireless) network card, network adapter and/or network interface controller (MC) installed therein. There may be one or more networks 110 at a particular site and the geographic coverage 114 of each network 110 may overlap fully, partially or not at all.

Additional networks 110 may be located in a second geographic area (not shown). For example, building 112 may be located in Waterloo, Ontario while the second geographic location may be located Mississauga, Ontario. While located in the vicinity of building 112, a wireless device 108 is able to communicate through one or more of the first group of WLANs 110. Similarly, while located in the vicinity of the second geographic location, that wireless device 108 would be able to communicate through one or more of the second group of WLANs. While travelling between the first and second geographic locations, a wireless device 108 may be able to communicate through one or more of each of the first and second groups of WLANs depending on available signal strength, transmitted power, etc. If WLAN networks are not available between first and second groups, then device can use wide-area wireless networks if available.

Each network 110 includes an antenna, access point (AP) 116 and supporting radio transmission equipment known to those skilled in the art. In an embodiment, each access point 116 is an IEEE 802.11 radio receiver/transmitter (or transceiver) and functions as a bridge between its respective WLAN 110 and network 102. For security, each access point 116 may be communicatively coupled to network 102 through a respective firewall and/or VPN (not shown). It provides data distribution services among devices 108 within network 110 and between devices 108 in network 110 and other devices in other connected networks. One distribution service provided by access point 116 for its related stations is to establish a logical connection between a device 108 and an access point 116.

Interface server 118 in network 102 provides hardware and software systems to allow network 102 to communicate with wireless networks 110. For communications directed to wireless devices 108, wireless services enterprise server 120 provides an interface with server 106 for transmissions destined to devices 108 and vice versa.

Database 122 provides a data storage system for one or more elements in network 102, including server 106. Security systems within network 102 can be provided by known techniques and systems. Gateway 124 provides and monitors selected communications between elements in network 102 and external devices connected through Internet 126.

Some further detail is provided on an exemplary installation for networks 110A and 110B relating to an embodiment. Networks 110A and 110B are implemented as Wireless Fidelity (Wi-Fi) networks generally following standards set by the IEEE LAN/MAN Standards Committee, known as IEEE 802, through its working group "11". The 802.11 standard defines media access control (MAC) and physical (PHY) layers in the Open Systems Interconnection (OSI) protocol model for WLAN. Such standards are known to those of skill in the art. Administrative functions for networks 110 may be provided by software controlling them. The software may administer functions such as network identification and network access parameters.

The initial 802.11 standard was followed with a series of amendments, where each amendment was identified by an alphabetic suffix following in the standard's numeric identifier "802.11". The family of 802.11 amendments is sometimes referred to as the 802.11x family. Currently, the 802.11 amendments encompass six wireless modulation techniques that all use the same communication protocol among their communicating elements. Wireless transmission for networks following the 802.11b and 802.11g amendments transmit communications in the 2.4 GHz frequency band. Networks following the 802.11a amendment transmit communications in the 5 GHz band. The 802.11b amendment was the first widely accepted wireless networking standard. Selected 802.11 amendments and terms are briefly discussed below.

The 802.11b amendment has a maximum raw data rate of 11 Mbit/s and uses a media access method defined in the original 802.11 standard. The 802.11b amendment uses Complementary Code Keying (CCK) to modulate its data. In field use, the typical maximum throughput is about 5.9 Mbit/s when data is transmitted using transmission control protocol (TCP) and 7.1 Mbit/s when using user datagram protocol (UDP). A 802.11b network is typically deployed as a point-to-multipoint configuration, wherein an access point 116 communicates via an omni-directional antenna with devices 108 in the transmission range of the access point. A typical indoor communication range is 30 m at 11 Mbit/s between devices 108 and the access point 116 and 90 m at 1 Mbit/s.

The 802.11g amendment provides a maximum raw data rate of 54 Mbit/s. Generally, devices 108 having 802.11g-compliant hardware can also communicate in 802.11b networks. Data can be modulated in a 802.11g network using one of several techniques, depending on the transmission rate, including: orthogonal frequency-division multiplexing (OFDM), CCK and Differential Binary Phase Shift Keying/Differential Quadrature Phase Shift Keying with Direct Sequence Spread Spectrum (DBPSK/DQPSK+DSSS). It has been observed that the maximum transmission range of 802.11g devices is slightly greater than that of 802.11b devices, but that the range that devices can achieve a full data rate which may be smaller than the rate of a 802.11b network. For North American transmissions, both the 802.11b/g protocols define 7 transmission channels. However, the full complement of channels, covering all worldwide regions, is 14 channels between 2.412 GHz and 2.484 GHz, where each channel is 22 MHz wide.

The 802.11a amendment modulates its transmissions using OFDM, providing a maximum raw data rate of 54 Mbit/s. The data rate is reduced in a step-wise fashion, as needed. For North American transmissions, the 802.11a amendment defines 12 non-overlapping channels, where eight (8) channels are dedicated to indoor deployments and four (4) channels are dedicated to point-to-point networks.

However, the full complement of channels, covering all world-wide regions, is 27 channels between 5.107 GHz and 5.805 GHz, where each channel is 20 MHz wide.

The 802.11n amendment was announced in 2004 and its real data throughput is estimated to be up to 540 Mbit/s. Projected speeds may be up to 50 times faster than transmissions in 802.11b and over 10 times faster than transmissions in 802.11a or 802.11g.

For a 802.11 network, a "station" is a basic component in the network. A station is any device that implements the functionality of a 802.11 protocol and has a connection to the wireless network. Typically the 802.11 connection and communication functions are implemented in hardware and software and may be provided in a network connection circuit or system in a network interface card (NIC) at the station. A station may be any device, including a laptop computer, handheld device 108, or an access point 116. Stations may be mobile, portable, or stationary. All stations support the 802.11 station services of authentication, de-authentication, privacy, and data delivery. For the purposes of an embodiment as it relates to 802.11 standards, devices 108 may be considered to be stations.

An Independent Basic Service Set ("IBSS") is a set defining a series of stations that communicate with an access point. The access point operates as a local relay for the stations. All stations communicate with the access point and preferably do not communicate with each other directly. All frames are relayed among the stations through the access point. The access point may also provide connection to a distribution system. For the purposes of an embodiment as it relates to 802.11 standards, each network 110 may be considered to be an IBSS. Other connection interfaces may be provided for a network, such as a direct link set-up or an ad-hoc set-up.

A service set identifier ("SSID") is a unique 32-character network name, or identifier, that is created and associated with a particular WLAN 110. The SSID can be any alphanumeric entry up to a maximum of 32 characters and is typically case sensitive. It may be set by a network administrator using network administration software for a control server of WLAN 110. The SSID should be chosen so that it differentiates one WLAN from another. As the SSID differentiates one WLAN from another, any APs and all wireless and other devices attempting to connect to a specific WLAN may require that a device provides the correct SSID for that WLAN before permitted the device to join that WLAN.

Further detail is now provided on messages generated and sent between components in WLAN 110. In a 802.11-compliant network, messages are sent between its AP 116 and its communicating devices 100 in data transmissions called frames. Frames are sent and processed in a "send-and-respond" protocol. As such a frame may be broadcast by an AP 116 to one or more devices 108. When a device receives a frame, it extracts data from the frame and then it may generate a response. A similar communication dialog may be initiated by a device 108 to AP 116. There are several classes of frames including control, management and data. Control frames assist in delivering data frames between stations. Management frames facilitate connection establishment and maintenance between a device 108 and AP 116. In particular management frames are used: to allow a device be associated, disassociated and re-associated to a network; to allow a device to be authenticated with a network; and to allow a device to initiate a probe request to an AP to request information about another device in a network. Frames may include additional information such as source and destination MAC addresses, a control field that provides information on the 802.11 protocol version, frame type and other status indicators. It will be appreciated that a person of skill in the art has knowledge of the protocols of the frames. Additional materials relating to same are provided in published 802.11 Working Group materials.

A beacon frame is a type of a management frame that is periodically broadcast by an AP 116 (e.g. every 100 ms) to provide a signal of its presence to the communication boundaries of its network. The body of a beacon frame contains: a beacon interval, providing the amount of time between beacon transmissions; a timestamp, which may be used by a station to synchronize itself and update its local clock; and the SSID of the WLAN 104 of the AP 116. The beacon frame can also provide: data indicating the supported transmission rates of the WLAN; data regarding the signalling parameters of the WLAN, such as frequency hopping spread spectrum, direct sequence spread spectrum, etc.; data on the capabilities of the WLAN; and data providing a traffic indication map (TIM). The beacon frame includes a frame header and cyclic redundancy checking (CRC) field. The destination address of the frame is set to all 1's, which is the broadcast MAC address. This will cause all other stations on the applicable channel to process a received beacon frame. Other embodiments may selectively broadcast a beacon or may vary the broadcast transmission parameters upon satisfaction of preset conditions.

Devices 108 and their NICs may continually scan 802.11 radio channels and listen for beacons. If multiple beacons are received from multiple APs, then device 108 may evaluate the parameters of the underlying networks to identify a most suitable network. Thereafter, the device would then attempt to establish communications to that network through the selected AP.

As noted above, before a station can be associated with a WLAN, it may need to obtain the SSID of the access point. Generally, a network identification functions (such as those functions provided by Windows XP) is provided on device 108 to allow the device to process the network information in a received beacon signal. The search may be active when the device actively searches for neighbouring networks. Alternatively or additionally, a passive search may be conducted where the device only listens for beacons broadcasted by access points. An active search may be conducted to attempt to discover access points whose SSIDs are not broadcasted (e.g. corporate APs). A passive search may be used for broadcasted SSIDs (e.g. "hot-spot" APs). Results from such searches can be used to extract the SSID data to configure device 108 and its associated NIC with the proper SSID for that WLAN.

Further detail is now provided on how a device 108 interacts with access point 116 when entering the coverage area of network 110. Each device 108 that enters a coverage area 114 needs to become associated with the related access point 116 before a communication connection is made to network 110. Once an association is made, access point 116 is able to use identification data relating to device 108 to determine where and how to deliver data to that device 108.

Device 108 associates with a WLAN as follows. As a device 108 roams into the coverage area 114, it periodically scans for any beacon signals on some or all channels on one or more classes of 802.11 network(s). When a beacon is found, the device extracts data parameters of particular network. If device 108 is receiving multiple beacon signals because multiple coverage areas 114 overlap at the particular location of device 108, then device 108 may go through an arbitration process to determine which beacon signal(s) to respond to. This enables a ranking of access points based on the received signal strength of the beacon or other parameters, such as capability information of the network. The NIC may then generate and send an association frame to its most preferred AP to attempt to associate with that AP.

After making a successful association, a station may continue to scan for other beacons in case the signal from the currently-associated access point become too weak to maintain communications. When an association is made, the following information about the communicating access point may be provided: its SSID, the type of security used by the SSID, the signal strength, the network type (802.11a/b/g), the address information of the access point (e.g. MAC address) and whether or not the network for this access point has a profile stored in the device 108. Generally, device 108 invokes the association service only once, typically when it enters a coverage area 114. Each device 108 can be associated with only one access point, but an access point 116 may be associated with multiple devices 108.

Figure 2:
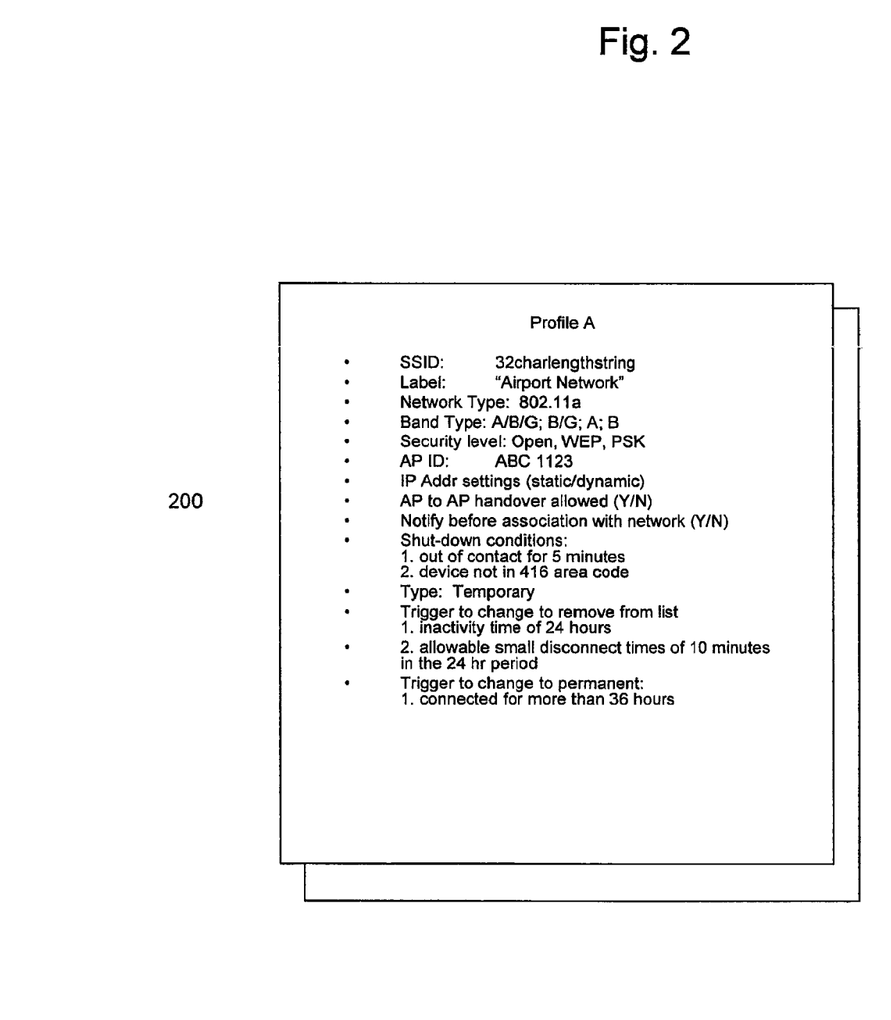
FIG. 2 is a block diagram of exemplary contents of a profile of a wireless connection stored and used by the wireless device of FIG. 1 in accordance with an embodiment.

Further detail is now provided on an embodiment and how it utilizes profiles and manages their presentation to a user of device 108. In order to assist a user in managing connection parameters for various network connections, a software application referred to herein as a profile management module (PMM) may be provided in device 108 to store, list and allow changes to be made to configurations and options for a particular connection. Referring to FIG. 2, for a WLAN implementation, profile 200 may store one or more of the following data about its associated connection: the SSID or WLAN name; a profile name (i.e., an optional alternative name for the WLAN other than the SSID, which may be displayed on a GUI on the device); the operating mode (e.g., infrastructure, ad hoc, etc.); the standard type (e.g., 802.11a, 802.11b, 802.11g, etc.); visibility conditions, including termination condition(s) for removal of profile from display (e.g. based on an inactivity time, such as 24 hours); and, security, encryption, and password settings (e.g., none, personal, enterprise, wired equivalency privacy ("WEP"), Wi-Fi protected access ("WPA"), etc.). Additional conditions or setting for a connection may also be stored in the profile, such as conditions for allowing activation of a search for a connection for the network and conditions for terminating the connection. It will be appreciated that a GUI may be designed to allow entry of all parameters for any of the items in the profile. The PMM (or another module) may provide one or more layered GUIs that are generated on device 108 to manage displaying of the profiles and their management facilities (e.g. entry and updating of data for any fields in the profile). It is notable that through visual cues in the GUI, each of the disabled, temporary and active profiles (as groups) are visually differentiated from each other.

For an embodiment, a profile is a key data point that the device uses to make its network connection attempts. A profile list contains all profiles that have connections that will be sought or tested by the device. If a profile is not in the list, then, in one embodiment, its associated connection is not tested by the device. In other embodiments, independent connections for networks that are not in the list may be conducted. However, a useful feature of the embodiment is to use the profile list as the repository for all potentially available connections to be sought by the device.

Device 108 can store in its database all of the profiles that have been access or can be accessed by the profile management module. Profiles are typically displayed to a user in a profile list on the display of device 108 and the list can be arranged and rearranged in any order that is most suitable for display on device 108 at a particular instance in time. Exemplary orderings include ordering by: network connection priority; frequency of use; time of last use; geographic proximity to current location of device, and others. When presented with the profile list, a user may switch between WLANs by making a new connection selection from the list. Data for the profiles and the profile list may be stored and accessed in any computer readable form accessible by device 108. For example, profiles may be stored in flash memory on device 108 in a format that can be retrieved by any software module operating thereon.

Additionally or alternatively, data for a profile or an entry in a profile may be initiated and sent remotely to device 108 through an enterprise policy for network 110, its network administrator or preloaded at the time of manufacturing or initial configuration. Wireless provisioning may include OMA WLAN provisioning through SMS or WAP as described in OMA Specification OMA-DM-2005-0045R01-CR_CP-WLAN, which is incorporated herein by reference. Additional parameters may be provided to control the ability to view, edit or delete a profile. An entry may include a flag setting which may selectively enable or disable scanning mode(s) on device 108. This remote access provides control over the end-usage of device 108, thereby allowing certain restrictions to be imposed on a device-level from a centralized location. For example, a device 108 can be restricted to use only a corporate network or only one class of access points.

Additional new profiles may be added to the known set of profiles by device 108 upon performing a search or "scan" for available WLANs in the vicinity of the device. In this case, the profile list will typically display available networks that broadcast their SSIDs and that are in range of the wireless device. The profile list may also include networks for which a user has previously entered a SSID and any required profile settings. In addition, the user may create new profiles for listing in the profile list through appropriate configuration input screens. If a new network is detected, some fields in the configuration screens may be pre-populated with data extracted from the connection information (such as the SSID, etc.). The list may or may not show profiles that have do not have an active connection for the device.

An embodiment provides features and techniques for managing the profile list. In particular, it provides for temporary and cached profiles, which provide additional flexibility to types of profiles previously used. Before providing further detail on embodiments relating to profiles and profile management, further detail is provided on components of device 108 as these components are referenced when describing features of profile management by an embodiment.

Figure 3:
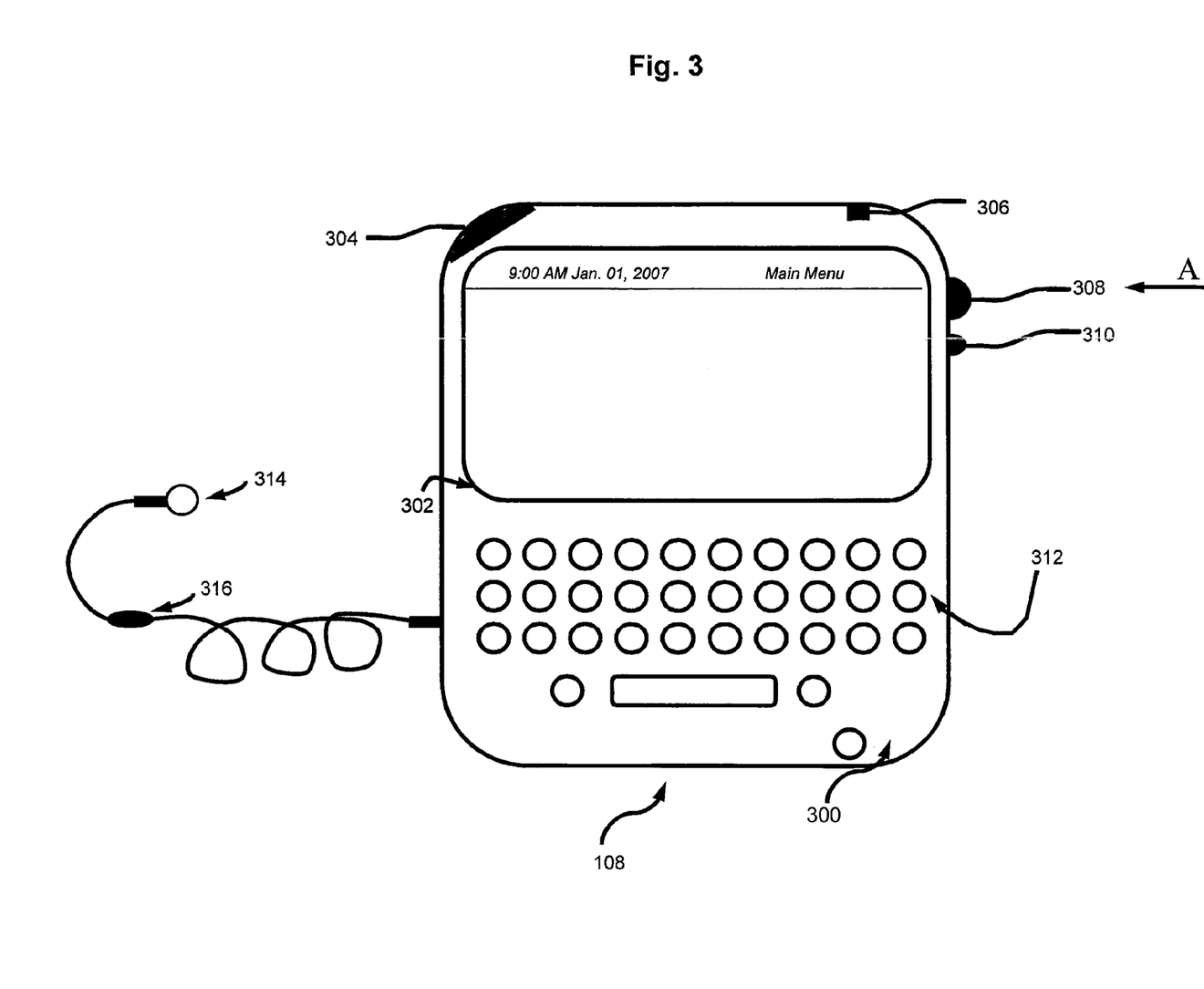
FIG. 3 is a schematic representation of the wireless electronic device in FIG. 1 in accordance with an embodiment.

FIG. 3 provides general features of an electronic device for receiving electronic communications in accordance with an embodiment of the disclosure, which is indicated generally at 108. In the present embodiment, electronic device 108 is based on a computing platform having functionality of an enhanced personal digital assistant with cellphone and e-mail features. It is, however, to be understood that electronic device 108 can be based on construction design and functionality of other electronic devices, such as smart telephones, desktop computers, pagers or laptops having telephony equipment. In a present embodiment, electronic device 108 includes a housing 300, an LCD 302, speaker 304, an LED indicator 306, a trackball 308, an ESC ("escape") key 310, keypad 312, a telephone headset comprised of an ear bud 314 and a microphone 316. Trackball 308 and ESC key 310 can be inwardly depressed along the path of arrow "A" as a means to provide additional input to device 108.

It will be understood that housing 300 can be made from any suitable material as will occur to those of skill in the art and may be suitably formed to house and hold all components of device 108.

Device 108 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 314 can be used to listen to phone calls and other sound messages and microphone 316 can be used to speak into and input sound messages to device 108.

Figure 4:
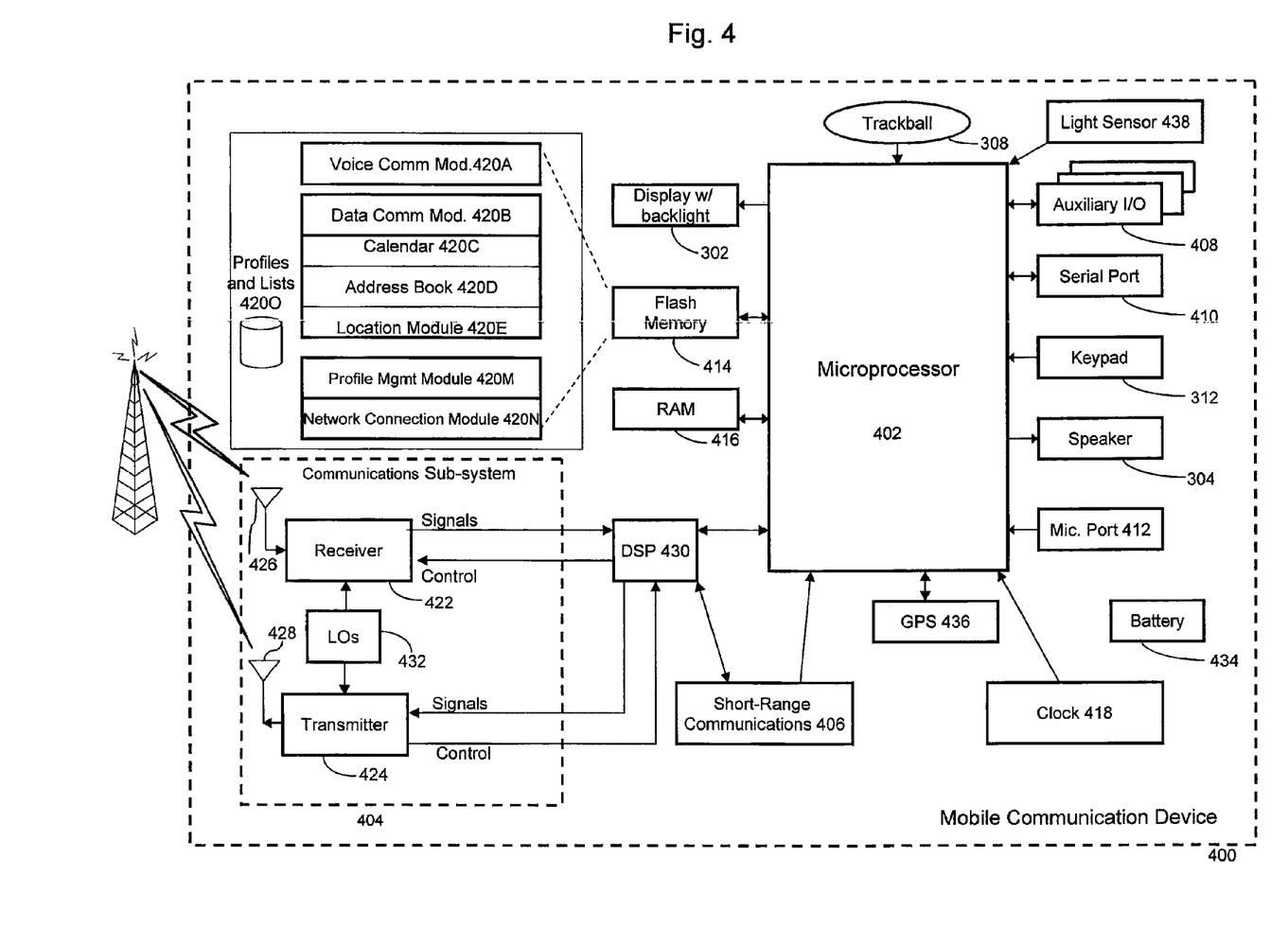
FIG. 4 is a block diagram of certain internal components of the device in FIG. 3.

Referring to FIG. 4, further detail is provided on functional components of device 108 per schematic 400. The functional components are generally electronic, structural or electro-mechanical devices or software or firmware that is executed on the components. In particular, microprocessor 402 is provided to control and receive almost all data, transmissions, inputs and outputs related to device 108. Microprocessor 402 is shown schematically as coupled to keypad 312 and other internal devices. Microprocessor 402 preferably controls the overall operation of the device 108 and its components. Exemplary microprocessors for microprocessor 402 include Data 950 (trade-mark) series microprocessors, the 6200 series microprocessors and the PXA900 series of baseband processors, all available from at one time from Intel Corporation. Microprocessor 402 is connected to other elements in device 108 through a series of electrical connections to its various input and output pins. Microprocessor 402 has an IRQ input line which allows it to receive signals from various devices. Appropriate interrupt firmware is provided which receives and reacts to the signals detected on the IRQ line.

In addition to the microprocessor 402, other internal devices of the device 108 are shown schematically in FIG. 4. These include: display 302; speaker 304; keypad 312; communication sub-system 404; short-range communication sub-system 406; auxiliary I/O devices 408; serial port 410; microphone port 412 for microphone 316; flash memory 414 (which provides persistent storage of data); random access memory (RAM) 416; clock 418 and other device sub-systems (not shown). Device 108 is preferably a two-way radio frequency (RF) communication device having voice and data communication capabilities. In addition, device 108 preferably has the capability to communicate with other computer systems via the Internet.

Operating system software executed by the microprocessor 402 is preferably stored in a computer-readable medium, such as flash memory 414, but may be stored in other types of memory devices, such as read-only memory (ROM) or similar storage element. In addition, system software, specific device applications, or parts thereof, may be temporarily loaded into a volatile store, such as RAM 416. Communication signals received by the mobile device may also be stored to RAM 416.

In addition to an operating system operating on device 108, additional software modules 420 enable execution of software applications on device 108. A set of software (or firmware) applications, generally identified as applications 420, that control basic device operations, such as voice communication module 420 and data communication module 420B, may be installed on the device 108 during manufacture or downloaded thereafter. As well, software modules, such as calendar module 420C, address book 420D and location module 420E.

Profile management module (PMM) 420M is software and/or firmware that provides processes to receive and update profile lists for wireless connections and to allow a user to define trigger conditions for commands for a network. It is also responsible for: storage, receipt of carrier and enterprise profiles through various communication channels; encryption of profile data; synchronization of profiles; and management of profiles in response to GUI interactions. PMM 420M generates a set of GUIs that are presented on display 302 of device 108. Any data or inputs provided from a user for a particular GUI is extracted and stored in the relevant profile location by PMM 420M. PMM 420M also provides most of the routines and processes to manage profiles, update their status and coordinate with other processes in device 108 (notably network connection module 420N, below). Data for individual profiles and profile lists may be stored in database 420O. The generation and display of a GUI for a profile or list of profiles by PMM 420M may be triggered upon any preset condition, such as the identification of a new connection, the loss of a current connection or a manual request made by the user. The presentation of the profiles in a GUI may follow known GUI techniques. If a particular profile or set of profiles is set to be emphasized or de-emphasized, this may be done by changing colours, backgrounds, font styles (e.g. bold, italics, shadow) and change the order of presentation of profiles, depending on what profile(s) are to be highlighted and what profile(s) are to be de-emphasized.

Network connection module (NCM) 420N is software and/or firmware that provides processes to detect and analyze when device 108 is in communication contact with one or more networks 110 and determine the parameters of each communicating network 110. It also controls when to seek, stop and/or report on a connection to a particular network. This function may involve using profile data as provided by profile management module 420M and database 420O. When NCM 420N is used to monitor 802.11x networks and issue commands relating thereto, the monitoring of signals and the initiation of commands may follow the functional requirement of 802.11 frames as noted earlier. The module can receive results of a network scan and match them against list(s) of active profiles and allow for a selection of a profile based on predetermined criteria. Such criteria may include signal strength, error rate, user preference, etc. It may also conduct all user interactions for an authentication process and report the status of a connection.

Additional modules such as personal information manager (PIM) application may be provided. Any module may be installed during manufacture or downloaded thereafter into device 108.

Data associated with each application, the status of one or more networks, profiles for networks and trigger conditions for commands for networks can be stored and updated in flash memory 414.

Communication functions, including data and voice communications, are performed through the communication sub-system 404 and the short-range communication sub-system 406. Collectively, sub-systems 404 and 406 provide the signal-level interface for all communication technologies processed by device 108. Various applications 420 provide the operational controls to further process and log the communications. Communication sub-system 404 includes receiver 422, transmitter 424 and one or more antennas, illustrated as receive antenna 426 and transmit antenna 428. In addition, communication sub-system 404 also includes processing modules, such as digital signal processor (DSP) 430 and local oscillators (LOs) 432. The specific design and implementation of communication sub-system 404 is dependent upon the communication network in which device 108 is intended to operate. For example, communication sub-system 404 of device 108 may operate with the Mobitex (trade-mark), DataTAC (trade-mark) or General Packet Radio Service (GPRS) mobile data communication networks and also operate with any of a variety of voice communication networks, such as 802.11 networks, Bluetooth networks, Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 108. In any event, communication sub-system 404 provides device 108 with the capability of communicating with other devices using various communication technologies, including instant messaging (IM) systems, text messaging (TM) systems, short message service (SMS) systems, enhanced message services (EMS) and multimedia message services (MMS).

Short-range communication sub-system 406 enables communication between device 108 and other proximate systems or devices, which need not necessarily be similar devices. For example, the short-range communication sub-system may include an infrared device and associated circuits and components, or a Bluetooth (trade-mark) communication module to provide for communication with similarly enabled systems and devices. DSP 432 may process some of the commands and signals destined for short-range system 408. In such an arrangement, profile management module 420M and/or NCM 420N may have procedures that control aspects of operation of module 408.

In addition to processing communication signals, DSP 430 provides control of receiver 422 and transmitter 424. For example, gains applied to communication signals in receiver 422 and transmitter 424 may be adaptively controlled through automatic gain-control algorithms implemented in DSP 430. One particular operational aspect of receiver 422 and antenna 426 is that they need to be tuned to receive signals in the 802.11 network bands, e.g. signals in the 2.4 GHz to 5.8 GHz range for sub-systems 406 and if needed, sub-system 404. Additional filters on antenna may also be used to provide such functionality. Module 420N can receive and interpret the signals and can generate its own signals for transmission to network 110. DSP 430 may be provided to assist in processing raw digital signals and commands from microprocessor 402 to sub-system 406.

Receiver 422, antenna 426 and network connection module (NCM) 420N provide at least some of the hardware and software elements needed to detect when device 108 is in the presence of communication signals from network 110, thereby enabling device 108 to communication with other devices in network 110.

Powering the entire electronics of the mobile handheld communication device is power source 434. In one embodiment, the power source 434 includes one or more batteries. In another embodiment, the power source 434 is a single battery pack, especially a rechargeable battery pack. A power switch (not shown) provides an "on/off" switch for device 108. A power source interface (not shown) may be provided in hardware, firmware, software or a combination of such elements to selectively control access of components in device 108 to power source 434. Upon activation of the power switch an application 420 is initiated to turn on device 108. Upon deactivation of the power switch, an application 420 is initiated to turn off device 108. Power to device 108 may also be controlled by other devices and by software applications 420.

Device 108 may also have global positioning system 436 to assist in identifying a present location of device 108 and may also have light sensor 438 to provide data on the ambient light conditions for device 108.

Further detail is now provided on an embodiment relating to the establishment and maintenance of a profile list of connections. In particular, using the profiles described above an embodiment can establish and maintain a set of rules to govern how and when a particular profile is accessed and how and when a connection attempt is made for that profile. To provide some context, Table A provides a listing of a progression of steps executed by an embodiment during detection of a new access point. Each row in scenario a is a point in time for the process, with lower rows occurring after upper rows. The input column indicates a input received by device 108. The response column indicates an action carried out by an embodiment in response to the input.

TABLE A

| Input | Response |
| --- | --- |
| Receiver in device 108 notifies applications in device 108 that the scan is successful | Network connection module 420N retrieves the data in the scan |
| PMM 420M generates GUI presenting scanning information of SSIDs for further configuration by user | User navigates through GUI to select a desired SSID and creates a WLAN profile |
| PMM 420M generates a GUI allowing a user to adds a newly created profile to the list of WLAN profiles | NCM 420N provides a GUI prompting user to select whether or not to connect to the network using this new WLAN profile |
| PMM 420M generates a GUI asking user to confirms a request to associate with the network using the new profile and user complies | PMM 420M adds the new profile to the list and causes NCM 420N to attempt to connect to the network using the new profile |
| PMM 420M generates a GUI asking user to confirms a request to associate with the network using the new profile and user declines | PMM 420M adds the new profile to the list |
| PMM 420M generates a GUI of a list of available access points; user selects an access point from the list, enters required credentials and adds the resulting profile to a list of configured profiles. [Note that in some configurations, this step may be omitted, as once a connection is identified, a separate configuration process may be initiated allowing the user to specify whether the profile is temporary or not] PMM 420M saves the newly configured profile in WLAN profile database. PMM 420M adds the profile to the bottom of the display list PMM 420M returns user to GUI screen of the results of the scan | NCM 420N can detect the added profile and try to associate with it. Alternatively, user can specify that the new profile is to be associated manually |

Based on some of the activities shown in Table A, exemplary access/searching features implemented in an embodiment for connections associated with profiles are described below. In one embodiment, after a user initiates a scan, if the scan is successful, the device may generate a list of neighbouring access points. Entries may include a known network that has a matching profile on the device. If the network is new, the device leads the user through a set of GUIs to configure the related profile. The device may then attempt to connect to the AP using the profile. Thereafter (regardless of the state of success of the connection), a GUI can be provided to further configure the profile (e.g. add labels, set the temporary flag etc.).

A first feature of an embodiment has NCM 420N initiating a search for discovered (i.e. reachable) SSIDs and then presents a list to the user (through a GUI) to allow the user to select from the list of discovered SSIDs. Thereafter, through PMM 420M an option is provided to add a WLAN profile for that SSID. If the profile is added, profile data 420O is updated and NCM 420N may immediately attempt to connect device 108 to that newly-added profile. In this scheme, device 108 would immediately try to associate with the network once a profile has been added to the list.

Once a profile has been added, the feature allows further refinements and associations to be defined for the profile. PMM 420M presents a GUI option to the user to provide a menu selection allowing network associations to be defined for the profile. In a case where a profile is pre-configured for a device 108, the device 108 may initiate the connection automatically. Once the profile is added to the list of profiles, it will be already for selection and activation by the user. One additional selection for the option would be to provide the user with the choice to select whether to connect using the profile. A further additional selection can be provided allowing the user to fix a setting determining whether the device 108 connects automatically or not. This further option may be alternatively or additionally set by input provided by the underlying enterprise server or network administrator, through a message sent to device 108 containing an appropriate command and data that can be accessed by PMM 420M.

It will be appreciated that there is a cost to conducting scans for connections to networks. The costs include processing cycles on device 108 and its associated power drain. Using a profile list as a basis for scanning can result in a larger portion of the processing bandwidth of device 108 as the entries in list increases. For example, if device 108 is out of range of a particular network entered in its profile list, device 108 will not be able to associate with that network, but it may still attempt to see if a connection can be established. Further, even when device 108 is in coverage, an association attempt may take some time, since network scanning is relatively time consuming procedure, especially as the number of profiles to scan is large. The costs can be compounded if more than one profile list is maintained. An embodiment provides several profile management techniques to address such processing cost issues with profile lists.

First, one feature imposes a restriction on the maximum number of WLAN profiles that device 108 tracks at a given point in time. The maximum number of profiles may be determined by the network 110 or its operator and that number may be downloaded to device 108 and subsequently incorporated into identified profiles. Alternatively, device 108 may be preset with a maximum number of the profiles.

Once the maximum number of profiles is set, the PMM 420M may monitor the current number of active profiles and provide a GUI message to the user when the maximum is exceeded. Thereafter PMM 420M may present in a GUI a list of options for new profiles, including an option to delete an existing profile or ignoring the new profile.

In operation, if the maximum number of active profiles has been reached and user tries to activate/connect device 108 using another profile, then PMM 420M may generate a warning dialog asking the user to disable at least one profile before proceeding. If total maximum number of profiles has been reached, a warning dialog may ask to remove one of the profiles before proceeding.

Second, the user may be presented with an option to enable or disable a certain profile for scanning. When profile has been disabled/de-activated, PMM 420M may reorganize the ordering of profiles presented to a user in a GUI, such that the disabled profile is located at the bottom of the list of profiles, thereby diminishing its importance. Other visual cues may be implemented to diminish its importance by some manner (e.g. lower intensity fonts, etc.). Preferably, the disabled profile will not have its network scanned.

If a profile is subsequently enabled or activated, PMM 420M may again reorganize the ordering of the profiles in the list and locate the enabled profile at or near the top of the list. In addition, when a profile is activated, device 108 may be placed in a manual scan mode to attempt to search for a connection for that activated profile, assuming that when the user enables a new profile, it is likely that the user wishes to associate with it immediately.

Third, an embodiment implements a temporary profile as a type of network profile. A temporary profile, as inferred, contains data on a network connection that is active under certain conditions, and is inactive under other conditions. The conditions for being active may be based on a time limit (e.g. active for the next three days) or a condition (e.g. active only while device 108 is in Toronto, Ontario) or a combination of time(s) and condition(s). The trigger conditions are periodically and or selectively analyzed by the PMM 420M to determine when a temporary profile is active and when it is not. PMM 420M can access the contents of the profiles, extract relevant values from the profiles, then initiate inquiries to other modules or systems on device 108 to retrieve relevant data to test against the trigger conditions. Such relevant data can include connection details, time, location (GPS) information, area code information and others. The additional conditions may be based on an event, location (through signal strength analysis, GPS signal analysis or other techniques), receipt of an external message or signal or an environment detected by device 108.

It will be appreciated that in the context of the profiles herein, the term "active profile" relates to a profile which is used in the process of scanning for the neighbouring networks. As such, an active profile may include a temporary profile and may not include a disabled profile.

In one embodiment, the user determines whether the profile being created for a particular network is a permanent profile or a temporary profile. This determination is achieved through presentation of options to the user through the GUI. The GUI may also present options to the user for the conditions to de-activate the profile. There may be a default set of conditions and parameters provided for a new profile that may be overridden in the GUI.

Figure 5:
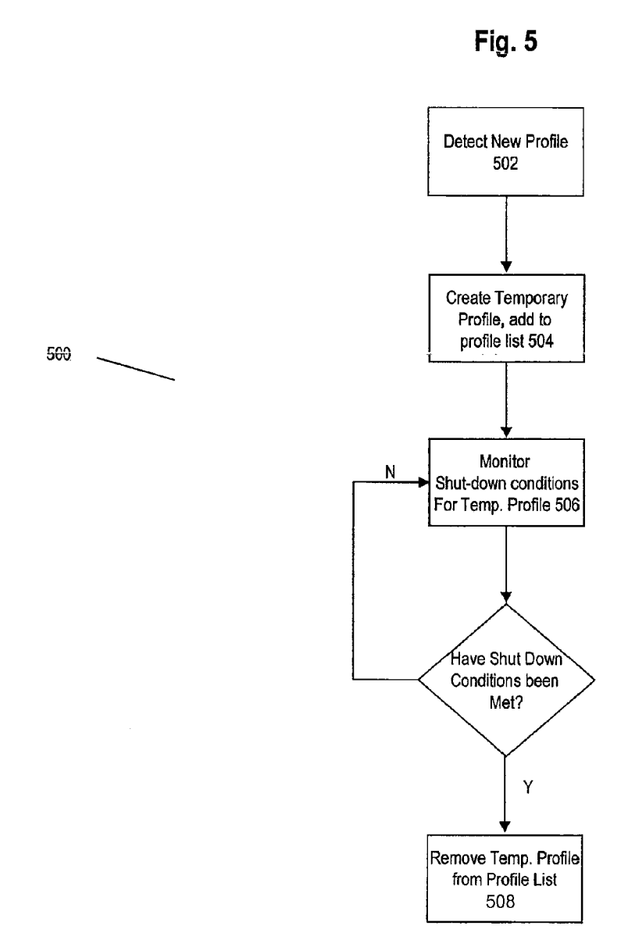
FIG. 5 is a flow chart of a process used to manage profiles used by the device of FIG. 1 according to an embodiment.

Referring to FIG. 5, flow chart 500 illustrates some steps and tests that are executed by device 108 and its PMM 420M in managing a temporary profile and its related connection. In an embodiment, temporary profile can be considered as active for as long as device 108 can successfully associate with the access point specified in the profile. An embodiment monitors for time(s) between associations to a profile. When a profile has been associated to by a device, the "profile time" is reset to zero, perhaps by the NCM 420N. Meanwhile, once an association is made PMM 420M continually monitors the temporarily profiles for their trigger conditions and deletes the "expired" ones, when the device clock indicates that a "timeout" has occurred for a temporary profile. Active temporary profiles are typically shown in more prominence than permanent profiles. The temporary profile can be used as long as device 108 can associate with the access point specified in the profile. When an association with an access point is initially lost, the system may allow a set (or time) for re-establishing the association, for example 3 minutes. As a further condition, an additional amount of time to account for "minor" periods of non-association may be built into the condition. For example, some additional time may be allowed to cover a situation where the user is walking or travelling around the access point and may temporarily move out and then move back into the transmission range of the access point. An exemplary time-out period is ten minutes after the loss of connection to the access point. Using those two conditions, the temporary profile is de-activated only upon its inability to communicate with the specific access point for the profile and upon expiry of the preset period of time. Upon de-activation of a temporary profile, its status is updated as being de-activated and it would be removed from the profile list.

In view of the above description of a temporary profile, process 500 has a first step of detecting whether a new connection has been detected that does not have an existing profile, per step 502. Next, presuming that the detected profile is a "new" profile, a GUI is activated to populate the parameters for the profile, including a default termination condition. Next at step 504, the connection is used per its typical operating parameters and then at some point, its shut down parameters are evaluated in step 506. If the shut down conditions are not met, then the process returns in a loop to allow the connection to be used or accessed again. If the shut-down conditions are met, then per test 506, the process moves to step 508, where the connection is formally shut down and the profile is removed from any relevant profile list(s).

In some configurations, a temporary profile is not provided with any default termination conditions and as such, such conditions need to be established and saved in its profile by the user through the PMM 420M.

While a temporary profile is active, it is available to be selected and activated. During that time, the temporary profile is preferably treated by device 108 as any "permanent" profile, such that it is included as part of a profile list, connection scan for available profiles or option list in a GUI on device 108 where available profiles are presented to the user. The temporary profile(s) may be shown with some prominence over the other profiles (e.g. at the top of the list or in a bold font, etc.) in some manner. However, when a temporary profile is deemed to be inactive, it is no longer included as part of any presentation or option list in the GUI.

To implement the features noted above, in an embodiment provides one or more modules (typically in software) that: monitor for detection of a connection for the device to a network; determine whether the connection is in the list; if the connection is not in the list, establish a temporary profile for the connection, to establish a set of activation conditions for the temporary profile and to add the temporary profile to the list; scans the list for any temporary profiles; and for each temporary profile in the list, determine whether its activation conditions are satisfied, and if the activation conditions are not satisfied, then remove that temporary profile from the profile list. The modules may be subdivided into smaller components and aspects of the modules may be implemented by one or both of PMM 420M and/or NCM 402N.

Different types of connections can be candidates for classification as a temporary profile. A newly located and previously unknown connection identified as a result of a scanning process by device 108 (e.g., connections created via a setup wizard application operating or WLAN scanning user interface application operating on device 108) may be a prime candidate for a temporary profile.

The embodiment may also define a set of conditions that would allow a temporary profile to be marked as permanent (or vice versa). Again, the list of conditions can vary and can be set by the user through a GUI operated through PMM 420M or through external messages sent from the network administrator to device 108. The presentation of the GUI and its navigation is provided in another module (again, typically in software) in an embodiment. This module may be a separate module or may be incorporated into another module (such as PMM 420M).

An embodiment also provides a cached profile, which shares some features with a temporary profile. A cached profile allows management of profiles relating to a local environment. Briefly, a cached profile is provided when device 108 is connected with a particular network and neighbouring networks are being scanned. The scan may be provided in an automatic or manual scan mode. If a neighbouring network is located in the scan, a (new) cached profile is created and device 108 is allowed to immediately attempt to establish a connection using the cached profile. The cached profile allows device 108 to continue operating in its current mode with its current network and still use the connection related to the cached profile as long as device 108 can establish a connection with the access point of the cached profile.

With a cached profile, device 108 may also try to re-connect using the cached profile if its connection is subsequently lost. Device 108 will use, store and track the cached profile until the association using it fails and/or after a timeout period. For example, a failure condition may be set if the user of device 108 moves out of the range of the connection for the cached profile and NCM 420N continues to try to use the new profile for a preset amount of time or a preset number of association attempts. If the connection attempts fail, device 108 may return to scanning through the profile list or trying to connect using a specific profile that was defined under a manual mode of operation.

Preferably, the cached status for a profile may be cancelled or changed at the option of the user through a GUI. PMM 420M provides an appropriate GUI to allow such a change. The cached status may be changed to permanent, temporary or delete, as required.

An exemplary use of a cached profile would be:
1. A user enters a coffee-shop and gains access to a Wi-Fi hot spot network inside the shop;
2. Next, the device scans for neighbouring access points;
3. Next, the device a (new) cache profile for a discovered access point and uses it for as long as device can connect to it;
4. Next, the user leaves the coffee shop and the hot spot and returns to his office. There, device 108 initiates its default (original) WLAN profile settings, since device can no longer associate with the coffee-shop access points.

A difference between a cached and temporary profile is that the cached profile may already exist in the list of profiles and it would remain in the list even if the association attempts fail. The temporary profile does not continually have its connection checked and is deleted from the list after certain termination conditions are met.

As another feature, a list of profiles can be managed by imposing a limit on the number of simultaneously scanned SSIDs (or WLAN profiles). Use of a limit may improve battery life as scanning takes time and resources. One exemplary process for scanning profiles is to divide the list of profiles into section and scan the first section for a preset number of times. Initially, the profiles in the first section will be considered as being the most actively used profiles for device 108. Subsequently, if device 108 does not associate with any of the profiles in the first section, device 108 may then attempt to scan the next set of profiles and subsequently repeat scanning lower sections in the list until the end of the list of active/enabled profiles is been reached. Then, to allow a quick reconnection, NCM 420N will specify some of the top profiles in its subsequent scan requests, allowing a quick reconnection if any of those profiles are detected.

Although an embodiment has been described in terms of seeking and/or otherwise searching for a 802.11 network, the features of an embodiment can be provided in other network technologies. For example, when a predetermined search criteria is satisfied, another embodiment may generate an active request signal for a network connection, instead of initiating a monitoring process for a particular beacon signal.

It will be appreciated that the PMM 420M, NCM 420N and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. For example, detection or completion of an event described in FIG. 5 may cause an interrupt to be generated on microprocessor 402 and a particular interrupt routine may be provided to process the event. It will further be appreciated that other applications and systems on device 108 may be executing concurrently with PMM 420M and/or NCM 420N. As such, one or both of PMM 420M and NCM 420N may be structured to operate in as a "background" application on device 108, using programming techniques known in the art.

The present disclosure is defined by the claims appended hereto, with the foregoing description being merely illustrative of embodiments of the invention. Those of ordinary skill may envisage certain modifications to the foregoing embodiments which, although not explicitly discussed herein, do not depart from the scope of the disclosure, as defined by the appended claims.

The invention claimed is:

1. A method for managing connections to networks for a communication device, comprising:
    storing, in memory of the communication device, a list of profiles of network connections for the communication device, each profile in the list of profiles representing a network connection, wherein a first section of the list of profiles includes a plurality of active profiles, each of the plurality of active profiles representing an active network connection to be scanned by the communication device;
    scanning, at the communication device, for active network connections included in the first section of the list of profiles;
    during the scanning, detecting, at the communication device, a new network connection for the communication device to an available network;
    in response to the detecting, determining whether the new network connection is in the list of profiles;
    absent determining that the new network connection is in the list of profiles:
    establishing a temporary profile associated with the new network connection;
    establishing a set of activation conditions for the temporary profile; and
    adding the temporary profile to the first section of the list of profiles;
    periodically determining, at the communication device, whether the new network connection associated with the temporary profile is active based on the set of activation conditions; and,
    absent determining, at the communication device, that the new network connection associated with the temporary profile is active based on the set of activation conditions, removing the temporary profile from the first section of the list of profiles.

2. The method for managing connections to networks for a communication device as claimed in claim 1, further comprising displaying, on the display of the communication device, the first section of the list of profiles, and wherein the set of activation conditions comprises a time condition for the new network connection, and wherein the time condition is that the communication device has used the new network connection associated with the temporary profile within a set time.

3. The method for managing connections to networks for a communication device as claimed in claim 2, further comprising:
    resetting the time condition by resetting a profile time associated with the temporary profile to zero when the communication device uses the new network connection associated with the temporary profile within the set time.

4. The method for managing connections to networks for a communication device as claimed in claim 3, wherein removing the temporary profile from the first section of the list of profiles comprises:
    deleting the temporary profile from the first section of the list of profiles.

5. The method for managing connections to networks for a communication device as claimed in claim 3, wherein removing the temporary profile from the first section of the list of profiles comprises:
    adding the temporary profile to a list of deactivated profiles.

6. The method for managing connections to networks for a communication device as claimed in claim 2, wherein the set of activation conditions further comprise a location parameter, and wherein temporary profile is removed from the first section of the list of profiles when both the time condition is not satisfied and the location parameter for the communication device is not satisfied.

7. The method for managing connections to networks for a communication device as claimed in claim 2, further comprising displaying, on the display of the communication device, the temporary profile is at a top of the first section of the list of profiles with any other temporary profiles.

8. The method for managing connections to networks for a communication device as claimed in claim 2, wherein the time condition permits short periods of non-contact of the communication device with the connection within the set time.

9. The method for managing connections to networks for a communication device as claimed in claim 1, further comprising:
scanning for additional available networks when the new connection is accessed by the communication device; and
displaying in the first section of the list of profiles a located network from the scanning for additional available networks.

10. The method for managing connections to networks for a communication device as claimed in claim 1, wherein scanning, at the communication device, for network connections identified in the first section of the list of profiles comprises:
scanning for network connections identified in the first section of the list of profiles a predetermined number of times and then scanning for network connections identified in a second section of the list of profiles.

11. The method for managing connections to networks for a communication device as claimed in claim 1, further comprising:
detecting, at the communication device, a second connection to a neighbouring network while the communication device is connected to the available network;
generating a cached profile associated with the connection to the neighbouring network while the communication device is connected to the available network;
updating the first section of the list of profiles to include the cached profile; and
removing the cached profile from the first section of the list of profiles when the second connection with the neighbouring network fails.

12. The method for managing connections to networks for a communication device as claimed in claim 1, wherein:
the list of profiles has a maximum number of profiles.

13. The method for managing connections to networks for a communication device as claimed in claim 1, wherein the networks are 802.11-class networks.

14. A communication device, comprising:
a display;
a communications subsystem for transmitting and receiving communication signals with a plurality of networks;
a network communication management module for monitoring connections detected by the communication device;
data storage device storing a list of profiles of network connections for the communication device, each profile in the list of profiles representing a network connection, a first section of the list of profiles including a plurality of active profiles, each of the plurality of active profiles representing an active network connection to be scanned by the communication device; and
a processor configured to:
scan for active network connections identified in the first section of the list of profiles using the network communication management module and the communication subsystem;
during the scan, detect a new network connection for the communication device to an available network, in response to the detecting, determine whether the new network connection is in the list of profiles and absent determining that the new network connection is in the list of profiles:
establish a temporary profile associated with the new network connection;
establish a set of activation conditions for the temporary profile; and
add the temporary profile to the first section of the list of profiles;
periodically determine whether the new network connection associated with the temporary profile is active based on the set of activation conditions; and,
absent determining that the new network connection associated with the temporary profile is active based on the set of activation conditions, remove the temporary profile from the first section of the list of profiles.

15. The communication device as claimed in claim 14, wherein the processor is further configured to display, on the display, the first section of the active profiles, and wherein the set of activation conditions including a time condition for the connection, and wherein the time condition is that the communication device had used the connection associated with the temporary profile within a set time.

16. The communication device as claimed in claim 15, wherein the processor is further configured to:
reset the time condition by resetting a profile time associated with the temporary profile to zero when the communication device uses the new network connection associated with the temporary profile within the set time.

17. The communication device as claimed in claim 14, wherein the processor is further configured to remove the temporary profile from the first section of the list of profiles by:
deleting the temporary profile from the first section of the list of profiles.

18. The communication device as claimed in claim 14, wherein the processor is further configured to remove the temporary profile from the first section of the list of profiles by:
adding the temporary profile to a list of deactivated profiles.

19. The communication device as claimed in claim 14, wherein the set of activation conditions comprise a time condition and a location parameter, and wherein when both the time condition is not satisfied and the location parameter for the communication device is not satisfied, the temporary profile is removed from the list of profiles.

20. The communication device as claimed in claim 14, wherein the module is further configured to:
detect a second connection to a neighbouring network while the communication device is connected to the new network connection;
generate a cached profile associated with the connection to the neighbouring network while the communication device is connected to the new network connection;
update the first section of the list of profiles to include the cached profile; and
remove the cached profile from the first section of the list of profiles when the second connection with the neighbouring network fails.

* * * * *